United States Patent [19]

Engelhard et al.

[11] 4,363,721

[45] Dec. 14, 1982

[54] METHOD OF USING CATALYSTS FOR REFORMING OR ISOMERIZING HYDROCARBONS IN THE PRESENCE OF HYDROGEN

[75] Inventors: Philippe Engelhard; Georges Szabo, both of Le Havre, France

[73] Assignee: Compagnie Francaise de Raffinage, Paris, France

[21] Appl. No.: 330,102

[22] Filed: Dec. 14, 1981

Related U.S. Application Data

[62] Division of Ser. No. 152,126, May 21, 1980, Pat. No. 4,329,258.

[30] Foreign Application Priority Data

May 22, 1979 [FR] France ................................. 79 13029

[51] Int. Cl.$^3$ ........................................... C10G 35/085
[52] U.S. Cl. ................................... 208/139; 585/482; 585/671; 585/748
[58] Field of Search ....................... 585/482, 671, 748; 208/139

[56] References Cited

U.S. PATENT DOCUMENTS

| | | | |
|---|---|---|---|
| 2,651,598 | 9/1953 | Ciapetta | 252/454 |
| 3,783,123 | 1/1974 | Young | 208/111 |
| 3,846,281 | 11/1974 | Mertzweiller | 252/441 |
| 3,851,003 | 11/1974 | Wilhelm | 585/434 |
| 3,915,845 | 10/1975 | Antos | 252/441 |
| 3,968,053 | 7/1976 | Rausch | 252/441 |
| 4,003,852 | 1/1977 | Hayes | 252/446 |
| 4,141,817 | 2/1979 | McVicker | 252/442 |

*Primary Examiner*—Curtis R. Davis

[57] ABSTRACT

These catalysts comprise:
  A refractory oxide-mineral carrier;
  a halogen element, present in combined form; and,
  in free or combined form,
    (a) a platinum-group metal, and
    (b) tin.

They are characterized in that they contain, moreover, a metal from groups Ia and IIa of the periodic table of the elements.

Specifically, said metal from groups Ia and IIa may be sodium, lithium, potassium, calcium or barium.

24 Claims, No Drawings

METHOD OF USING CATALYSTS FOR REFORMING OR ISOMERIZING HYDROCARBONS IN THE PRESENCE OF HYDROGEN

This is a division of application Ser. No. 152,126, filed May 21, 1980, now U.S. Pat. No. 4,329,258.

The present invention relates to novel catalysts for the hydrotreatment of hydrocarbons. It further relates to the use of said catalysts in the reforming and isomerization of hydrocarbons in the presence of hydrogen.

By catalytic hydrotreating processes are meant treatments to which hydrocarbon charges are subjected in the presence of hydrogen and of a catalyst and which involve, separately or concurrently, hydrogenation, dehydrogenation, isomerization, cyclization, dehydrocyclization and aromatization reactions.

One example of a process in which these reactions occur concurrently is catalytic hydroreforming, a process which is employed particularly in treating petroleum fractions intended for the manufacture of gasolines in order to increase the octane number of these fractions. This process has come into wide use as a result of the present demand for motor-fuel gasoline. Moreover, the current trend toward the reduction of atmospheric pollution caused by automotive vehicles calls for the production of gasolines which can be used "as is," without the addition of tetraethyllead, to increase the octane rating.

In catalytic hydroreforming, the operating conditions are selected so that cracking reactions are minimized and the dehydrocyclization, dehydrogenation and isomerization reactions are promoted.

Particularly when paraffins and naphthenes are used as feedstock, the dehydrocyclization and dehydrogenation reaction, respectively, results in the formation of aromatic hydrocarbons which, apart from being of interest as fuels because of their high octane number, are suited for use as raw materials in the petrochemical industry.

Another example of a catalytic hydrotreating process is the process for isomerization of hydrocarbons. This process may be employed particularly with aromatic and saturated or olefinic aliphatic hydrocarbons. For example, it may be used with aromatic hydrocarbons to increase the production of paraxylene, which is of particular interest as a raw material in the manufacture of polyesters.

The most widely used catalysts are those which contain a platinum-group metal, usually platinum, supported on a refractory oxide mineral of large specific surface, such as alumina. Bi- or trimetallic catalysts, which have improved properties, such as higher stability, have come into use.

Thus, catalysts containing tin and platinum are known. For example, French Pat. No. 2,031,984 and the addition thereto, No. 2,130,881, which are owned by the applicants' assignee, describe catalysts containing platinum and, optionally, iridium, as well as at least one element from the group consisting of lead, tin and germanium.

Catalysts containing platinum, tin and metals from group Ia or IIa are further known from U.S. Pat. Nos. 3,851,003, 3,909,451 and 3,998,900. In the examples described in these patents, the catalysts always have a ratio M2/M1 (number of atoms of a metal M2 from group Ia or IIa to number of atoms of a metal M1 from the platinum group) greater than 10. These catalysts are used primarily in the dehydrogenation of saturated aliphatic hydrocarbons. Said patents indicate (see column 3, line 63 et seq., of U.S. Pat. No. 3,851,003, for example) that the presence of an alkali or alkaline-earth metal diminishes the isomerization and aromatization reactions.

The applicants have found that it is possible to increase, in a hydroreforming process, the yield, particularly of aromatic hydrocarbons, which makes for a high-octane fuel, by using catalysts which in addition to a platinum-group metal and tin contain at least one metal selected from the group consisting of the metals of groups Ia and IIa of the periodic table of the elements and have an M2/M1 ratio not over 10, these catalysts being also suited for use in the isomerization of alkylaromatic hydrocarbons.

The present invention thus proposes catalysts which on the one hand make it possible to obtain improved yields of effluents having a very good octane number and, on the other hand, lend themselves to the isomerization of alkylaromatic hydrocarbons.

To this end, the present invention has as a first preferred embodiment catalysts for the hydrotreatment of hydrocarbons which comprise
a refractory oxide-mineral carrier;
a halogen element, present in combined form; and,
in free or combined form,
  (a) from 0.02 to 2% and preferably from 0.10 to 0.70%, based on the total weight of the catalyst, of at least one metal M1 from the platinum group, and
  (b) from 0.02 to 2%, and preferably from 0.05 to 0.60%, based on the total catalyst weight, of tin,
said catalysts being characterized in that they contain, in combined form, at least one metal M2 selected from groups Ia and IIa of the periodic table of the elements in such an amount that the ratio M2/M1 of the number of atoms of the metal M2 to the number of atoms of the metal M1 is such that $0.2 \leq M2/M1 \leq 10$ and, preferably, $0.5 \leq M2/M1 \leq 5$.

Under this definition of the invention and throughout this application, the term "platinum-group metal" means one of the following metals: Ruthenium, rhodium, palladium, osmium, iridium, and platinum.

The invention relates more particularly to catalysts as defined above wherein
  (a) the carrier has a specific surface greater than 15 $m^2$ per gram and a specific pore volume greater than 0.1 $cm^3$ per gram, and
  (b) the halogen content, determined in the elemental form and based on the total catalyst weight, is comprised between 0.3 and 3%, and preferably between 0.6 and 2.3%.

Second preferred embodiments of the present invention involve the use of the catalysts defined above in the hydrorefining of petroleum fractions which contain less than 10 ppm, and preferably less than 1 ppm, by weight of sulfur, and whose boiling temperature at atmospheric pressure ranges from 35 to 250° C.

Third preferred embodiments of the invention involve the use of the catalysts in accordance with the invention in the isomerization of hydrocarbons in the presence of hydrogen.

The carriers for the catalysts in accordance with the invention should be refractory substances having an adequate specific surface and pore volume. The specific surface is comprised between 15 and 350 $M^2/g$, and preferably between 100 and 350 $m^2/g$, and the specific pore volume is greater than 0.1 cm$^3$g. The substances should, moreover, have a more or less pronounced acidic character since the isomerization reactions are known to take place on acid sites. Alumina and aluminosilicates, for example, are well suited for the fabrication of these carriers.

The most advantageous catalysts are those whose platinum-group metal content is comprised between 0.02 and 2%, based on the total catalyst weight. To obtain satisfactory catalytic properties, the content of said metal is preferably greater than 0.10%; however, for reasons of catalyst cost, it is preferably not higher than 0.70%.

The tin content, based on the total catalyst weight, is comprised between 0.02 and 2% since below 0.02% and above 2% the improvement in catalytic properties over a catalyst containing only platinum is negligible.

The applicants have further found that the most efficacious contents are those comprised between 0.05 and 0.60%.

The halogen content may be comprised between 0.3 and 3%, and preferably between 0.6 and 2.3%, based on the total catalyst weight. The halogen present in the catalysts in accordance with the invention is preferably chlorine. It may be introduced into the catalyst composition in a manner known in the art, for example, during the preparation of the carrier, or during the deposition of the metallic elements, by the use of solutions of metal chlorides, for example.

The content of a metal M2 from groups Ia and IIa is such that the ratio M2/M1 of the number of atoms of the metal M2 to the number of atoms of the metal M1 from the platinum group is comprised between 0.2 and 10, and preferably between 0.5 and 5. When the ratio is less, the yield of high-octane effluent is not improved; and with higher ratios the stability of the catalyst diminishes.

The applicants have thus produced catalysts wherein the metal M2 is sodium, lithium, potassium, calcium or barium.

The catalysts in accordance with the invention may be prepared by conventional procedures for impregnation of the carrier with solutions containing the elements to be deposited.

The impregnation of the carrier may be carried out:
(a) With at least one solution containing the three elements to be deposited; or
(b) with at least two solutions, one containing two of the elements to be deposited, the other the third; or
(c) with at least three solutions, each containing one of the elements to be deposited.

The deposition of the metals may be carried out from solutions of soluble compounds of these metals, such as hexachloroplatinic acid, stannous chloride or the chloride of the metal from groups Ia and IIa.

The tin is preferably deposited before the platinum-group metal.

When the metals are not deposited simultaneously, the solid obtained may be calcined between depositions at a temperature which in the case of tin is comprised between 400° and 700° C. and is preferably 600° C. or less, said calcination temperature being under 600° C. in the case of the platinum-group metals and under 550° C. in the case of platinum. In the case of the metals of groups Ia and IIa, the calcination temperature is under 600° C.

When all of the metals have been deposited, the solid obtained is calcined at a temperature of less than 550° C.

Before this calcination, and after the last deposition, the halogen content of said solid may be adjusted by known means, such as an oxychlorination treatment.

The acidity of the carrier may be altered by an acid treatment with hydrochloric acid, for example, before the deposition of the elements, during the deposition or between depositions when the latter are not simultaneous.

The catalysts in accordance with the invention may be used in the hydrotreatment of hydrocarbon charges.

They are particularly well suited for use in processes for the hydroreforming of petroleum fractions intended for the manufacture of high-octane gasolines as well as in processes for the isomerization of aromatic hydrocarbons.

The catalyst may be activated prior to the hydrotreatment by reduction with hydrogen.

The activity of the catalyst may be maintained during the hydrotreatment by adding a soluble hydrogenated compound (a chlorine, for example) to the charge. It may also be advantageous to presulfurize the catalyst with a sulfurized hydrogen stream, for example, in order to minimize the cracking reactions which tend to occur at the start of the treatment.

The hydroreforming operation is carried out under the following conditions:
Temperature: From 450° to 600° C.
Pressure: From 5 to 50 bars.
Molar ratio of hydrogen to hydrocarbons: From 2 to 10.
Hourly space velocity of charge (volume of gas passing over a unit volume of catalyst per hour): From 0.5 to 5.

The hydroreforming process using the catalysts in accordance with the invention may, in particular, be of the so-called "regenerative" type in which a portion of the catalyst is continuously withdrawn from the reactor, continuously regenerated by burning off the carbon formed with oxygen, either diluted or undiluted, and continuously recycled to the reactor after activation by reduction with hydrogen.

The isomerization of aromatic hydrocarbons is carried out under the following operating conditions:
Temperature: From 300° to 600° C.
Pressure: From 5 to 50 bars.
Molar ratio of hydrogen to hydrocarbons: From 2 to 20.
Hourly space velocity of charge (as defined above): From 0.5 to 5.

As will be shown in the examples which follow, and which are in no wise limitative, the applicants have obtained highly satisfactory results with various catalysts in accordance with the invention.

Example 1 relates to the preparation of catalysts in accordance with the invention and of control catalysts.

Example 2 relates to the use of catalysts in accordance with the invention and of control catalysts in the hydroreforming of a charge of normal heptane.

The nature of said charge does not constitute a limitation of the field of use of said catalysts since such a charge is generally used to test the performance of hydroreforming catalysts. The results obtained may therefore be extended to the case where the charge is a fraction intended for the manufacture of high-octane gasoline whose boiling temperature ranges from 35° to 250° C. and whose sulfur content is less than 10 ppm, and preferably less than 1 ppm.

Example 3 relates to the isomerization of a charge formed by a mixture of ethylbenzene, xylenes and toluene.

EXAMPLE 1

This example relates to the preparation, from a starting alumina, of:

(1) A control catalyst T consisting of platinum, tin and alunina and containing less than 100 ppm of sodium, this very small amount of sodium stemming presumably from the starting alumina and from the water used in its preparation.

(2) Catalysts A1, A2, A3, A4, A5, B, C, D and E, consisting of platinum, tin and alumina and containing in addition more than 100 ppm of a metal from group Ia or IIa, introduced into the catalyst in accordance with a method of preparation which will be described further on.

The starting alumina used is in the form of extrudates having the following characteristics:
Average diameter of extrusions: 1.5 mm
Specific surface: 190 m$^2$/g
Pore volume: 0.51 cm$^3$/g
Chlorine content (as measured by x-ray fluorescence): 0.5% by weight of the alumina This alumina is calcined for 4 hours at 600° C. It will form the carrier for the catalysts prepared and tested in this example and will hereinafter be referred to as carrier alumina.

PREPARATION OF CONTROL CATALYST T 100 g of starting alumina is immersed in 250 cm$^3$ of an aqueous solution containing 7 cm$^3$ of hydrochloric acid and 7 cm$^3$ of nitric acid which is circulated over the alumina for half an hour.

A second solution containing 0.380 g of stannous chloride, SnCl$_2$.2H$_2$O, 10 cm$^3$ of hydrochloric acid and 10 cm$^3$ of water is then added to the first solution. The resulting solution is circulated for 2 hours.

After draining, the solid obtained is immersed in 80 cm$^3$ of water, which is circulated for 2 hours.

After renewed draining, the solid obtained is immersed in 120 cm$^3$ of a solution of hexachloroplatinic acid containing 3 g/l of platinum. This solution is circulated for 4 hours.

After draining, the alumina is dried for 1 hour at 120° C., then calcined at 530° C. for 2 hours.

The composition of the catalyst T so obtained is as follows:
Platinum, wt. %: 0.40
Tin, wt. %: 0.21
Chlorine, wt. %: 0.98
Sodium, ppm: 58

PREPARATION OF CATALYSTS A1, A2, A3, A4, A5, B, C, D and E

The catalysts A1, A2, A3, A4, A5, B, C, D and E are prepared like the catalyst T up to the calcination step at 530° C. following the deposition of the platinum.

100 g of the solid obtained is then placed in a rotary evaporator with 250 cm$^3$ of a chloride solution of a metal from group Ia or IIa of variable concentration. The composition of the solutions is given in Table I which follows.

TABLE I

| Catalyst | Chloride solution of | Concentration g/l |
|---|---|---|
| A1 | Sodium | 0.132 |
| A2 | Sodium | 0.538 |
| A3 | Sodium | 0.843 |
| A4 | Sodium | 0.884 |
| A5 | Sodium | 1.493 |
| B | Potassium | 0.917 |
| C | Lithium | 0.274 |
| D | Calcium | 1.554 |
| E | Barium | 3.344 |

After evaporation, the solids are dried for 18 hours at 120° C. and then calcined for 2 hours at 530° C.

The chlorine content is adjusted by means of an oxychlorination treatment.

Catalysts A1, A2, A3, A4, A5, B, C, D and E are thus obtained whose compositions are given in Table II below.

TABLE II

| Catalyst | Platinum Wt. % | Tin Wt. % | Chlorine Wt. % | Metal from group Ia or IIa Kind | Content ppm |
|---|---|---|---|---|---|
| A1 | 0.40 | 0.21 | 0.89 | Sodium | 130 |
| A2 | 0.40 | 0.21 | 0.89 | Sodium | 530 |
| A3 | 0.40 | 0.21 | 2.15 | Sodium | 830 |
| A4 | 0.40 | 0.21 | 0.97 | Sodium | 870 |
| A5 | 0.40 | 0.21 | 1.06 | Sodium | 1470 |
| B | 0.40 | 0.21 | 0.87 | Potassium | 1200 |
| C | 0.40 | 0.21 | 0.90 | Lithium | 150 |
| D | 0.40 | 0.21 | 0.87 | Calcium | 1400 |
| E | 0.40 | 0.21 | 0.89 | Barium | 5500 |

EXAMPLE 2

This example relates to catalytic tests run in the hydroreforming of a charge of normal heptane with the catalysts prepared in example 1.

25 cm$^3$ of catalyst is placed in a stainless-steel reactor. A stream of pure, dry hydrogen is then passed over the catalyst for 2 hours, the temperature of the catalyst being maintained at about 500° C., and the pressure in the reactor being maintained at 7 bars. The charge consisting of normal heptane is then introduced at an hourly space velocity of 2 and a ratio of moles of hydrogen introduced to moles of normal heptane introduced of 5.

The tests are run at a fixed octane number, that is to say, as soon as a decrease in octane number is observed, the reactor temperature is raised in order to bring the octane number to the level originally selected, which in this example is 103.

Samples taken from the reactor effluent permit determination of both the composition of the effluent and the equivalent octane number of the liquid by application to the chromatographic analyses of the ASTM blend numbers appearing on the graphs with which those skilled in the art are familiar.

The variation of the reactor temperature as a function of time closely resembles a straight line whose gradient is measured. The milder the gradient of that straight line, the better the catalyst, as the temperature then needs to be adjusted but very slightly in the course of time to secure the desired octane number. The time which it takes to reach the limit temperature of use then is extended, which is a decided advantage in industrial applications.

The results of these tests are presented in Table III which follows.

TABLE III

| Test | Catalyst | Average C$_5$+* yield Wt. % | Average hydrogen yield (ltr/ltr)** | Initial temperature °C. | Temperature gradient as a function of time |
|---|---|---|---|---|---|
| T1 | T | 59.5 | 227.9 | 509.4 | 0.073 |
| A11 | A1 | 59.7 | 219.0 | 512.6 | 0.090 |
| A21 | A2 | 61.2 | 223.8 | 516.5 | 0.073 |
| A41 | A4 | 62.2 | 251.2 | 522.9 | 0.100 |
| A51 | A5 | 63.8 | 276.7 | 536.3 | 0.151 |
| B11 | B | 63.1 | 270.5 | 539.1 | 0.243 |
| C11 | C | 61.0 | 232.2 | 526.1 | 0.095 |
| D11 | D | 63.3 | 264.7 | 542.1 | 0.125 |
| E11 | E | 64.5 | 287.9 | 547.7 | 0.162 |

*C$_5$+: Hydrocarbons having 5 or more carbon atoms, including aromatic hydrocarbons. This figure is particularly representative of the yield obtained with the catalyst as these hydrocarbons have a high octane number.
**ltr/ltr: Liters of hydrogen/liter of charge, as measured under normal conditions. This figure is also representative of the yield as the hydrogen is obtained through dehydrogenation and dehydrocyclization reactions.

It is apparent from this table that the C$_5$+ and hydrogen yields are higher when metals from group Ia or IIa are present in a larger amount than in the control catalyst, which demonstrates the superiority of the catalysts in accordance with the invention.

EXAMPLE 3

This test relates to the isomerization of a charge consisting of a mixture of ethylbenzene, xylenes and toluene with the aid of catalyst A3 in accordance with the invention.

20 cm³ of catalyst A3 is placed in a stainless-steel reactor. A stream of pure, dry hydrogen is then passed over the catalyst for 2 hours, the temperature of the catalyst being maintained at 500° C. and the pressure in the reactor being maintained at 22 bars. After the temperature has been reduced to 480° C., the charge is introduced, which has the following composition, in weight percent:

Toluene: 1.08
Ethylbenzene: 26.15
Paraxylene: 2.34
Metaxylene: 68.19
Orthoxylene: 2.23

The charge is introduced at an hourly space velocity of 2 and a ratio of moles of hydrogen introduced to moles of hydrocarbons of 7.5.

Samples are taken from the effluent after 19½, 23 and 26¼ hours. The condensed liquid effluent is analyzed by chromatography. The results are presented in Table IV which follows.

TABLE IV

| | | Time | |
|---|---|---|---|
| | 19½ h | 23 h | 26¼ h |
| Yield in liquid products, % | 100 | 96.80 | 97.63 |
| Composition of effluent, wt. % Uncondensed light hydrocarbons | 0 | 3.20 | 2.37 |
| Liquid products | | | |
| Hydrocarbons having from 1 to 4 carbons | 0 | 0.11 | 0.06 |
| Hydrocarbons having 5 carbon atoms | 0 | 0.14 | 0.09 |
| Hydrocarbons other than benzene having 6 carbons | 0 | 0.18 | 0.08 |
| Benzene | 0.31 | 0.74 | 0.70 |
| Hydrocarbons other than toluene having 7 carbons | 0.05 | 0.38 | 0.38 |
| Toluene | 2.10 | 3.21 | 3.24 |
| Hydrocarbons other than xylenes and ethylbenzene having 8 carbon atoms | 0.92 | 0.53 | 0.45 |
| Ethylbenzene | 21.12 | 17.80 | 18.26 |
| Paraxylene | 14.01 | 16.74 | 15.99 |
| Metaxylene | 50.22 | 43.03 | 44.40 |
| Orthoxylene | 11.27 | 13.94 | 13.98 |
| Ethylbenzene conversion | 19.24 | 31.93 | 30.17 |
| Ratio xylenes at outlet / xylenes at inlet | 1.038 | 1.013 | 1.022 |

It is apparent from this table that the catalysts in accordance with the invention are good isomerization catalysts, the ratio (xylenes at outlet/xylenes at inlet) being high, which demonstrates that a large portion of the converted ethylbenzene is in the form of xylenes.

We claim:

1. Method for the reforming of hydrocarbon fractions whose sulfur content is less than 10 ppm, and whose boiling temperature at atmospheric pressure ranges from 35° to 250° C., comprising the use of a catalyst, in the presence of hydrogen, wherein said catalyst comprises:

a refractory oxide-mineral carrier;
a halogen element present in combined form;
in free or combined form from 0.02 to 2%, based on the total weight of catalyst, of at least one metal M1 from the platinum group;
in free or combined form from 0.02 to 2%, based on the total weight of catalyst, of tin; and
in combined form, at least one metal M2 selected from groups Ia and IIa of the periodic table of the elements in such an amount that the ratio M2/M1 of the number of atoms of the metal M2 to the number of atoms of the metal M1 in such that $0.2 \leq M2/M1 \leq 10$.

2. A process according to claim 1, wherein said carrier has a specific surface greater than 15 m²/g and a specific pore volume greater than 0.1 cm³/g, its halogen content is comprised between 0.3 and 3%, based on the total weight of the catalyst, and the platinum-group metal is platinum.

3. A process according to claim 2, wherein the halogen contained in the catalyst is chlorine.

4. A process according to claim 3, wherein the carrier is an alumina whose surface area is comprised between 15 and 350 m²/g.

5. A process according to claim 4, wherein the platinum content is from 0.1 to 0.7%, the tin content is from 0.05 to 0.06%, the chlorine content is between 0.6 and 2.3%, the surface area of the carrier is between 100 and 350 m²/g, and the M2/M1 ratio is from 0.5 to 5.

6. A process according to claim 2, characterized in that the metal M2 is sodium.

7. A process according to claim 2, characterized in that the metal M2 is lithium.

8. A process according to claim 2, characterized in that the metal M2 is potassium.

9. A process according to claim 2, characterized in that the metal M2 is calcium.

10. A process according to claim 2, characterized in that the metal M2 is barium.

11. A process according to one of claims 6 to 10, wherein the catalyst is prepared by a procedure comprising at least one impregnation of the porous carrier with at least one solution containing at least one element selected from the group consisting of tin, the metals of groups Ia and IIa, and the platinum-group metals.

12. A process according to claim 11, wherein said carrier is calcined between individual depositions at a temperature which in the case of tin is comprised between 400° and 700° C.;

in the case of platinum is under 550° C.;

in the case of the other platinum-group metals is under 600° C.; and in the case of the metals of groups Ia and IIa is under 600° C.

13. Method for the isomerization of hydrocarbons, comprising the use of a catalyst, in the presence of hydrogen, wherein said catalyst comprises:

a refractory oxide-mineral carrier;

a halogen element present in combined form;

in free or combined form from 0.02 to 2%, based on the total weight of catalyst, of at least one metal M1 from the platinum group;

in free or combined form from 0.02 to 2%, based on the total weight of catalyst, of tin; and in combined form, at least one metal M2 selected from groups Ia and IIa of the periodic table of the elements in such an amount that the ratio M2/M1 of the number of atoms of the metal M2 to the number of atoms of the metal M1 is such that $0.2 \leq M2/M1 \leq 10$.

14. A process according to claim 13, wherein said carrier has a specific surface greater than 15 m²/g and a specific pore volume greater than 0.1 cm³/g, its halogen content is comprised between 0.3 and 3%, based on the total weight of the catalyst, and the platinum-group metal is platinum.

15. A process according to claim 14, wherein the halogen contained in the catalyst is chlorine.

16. A process according to claim 15, wherein the carrier is an alumina whose surface area is comprised between 15 and 350 m²/g.

17. A process according to claim 16, wherein the platinum content is from 0.1 to 0.7%, the tin content is from 0.05 to 0.06%, the chlorine content is between 0.6 and 2.3%, the surface area of the carrier is between 100 and 350 m²/g, and the M2/M1 ratio is from 0.5 to 5.

18. A process according to claim 14, characterized in that the metal M2 is sodium.

19. A process according to claim 14, characterized in that the metal M2 is lithium.

20. A process according to claim 14, characterized in that the metal M2 is potassium.

21. A process according to claim 14, characterized in that the metal M2 is calcium.

22. A process according to claim 14, characterized in that the metal M2 is barium.

23. A process according to one of claims 18 to 22, wherein the catalyst is prepared by a procedure comprising at least one impregnation of the porous carrier with at least one solution containing at least one element selected from the group consisting of tin, the metals of groups Ia and IIa, and the platinum-group metals.

24. A process according to claim 23, wherein said carrier is calcined between individual depositions at a temperature which in the case of tin is comprised between 400° and 700° C.;

in the case of platinum is under 550° C.;

in the case of the other platinum-group metals is under 600° C.; and in the case of the metals of groups Ia and IIa is under 600° C.

* * * * *